United States Patent [19]

Kenderi

[11] Patent Number: 4,739,182
[45] Date of Patent: Apr. 19, 1988

[54] HYDROPNEUMATIC WATER ENGINE

[76] Inventor: Tibor Kenderi, Kelenhegyi ut 49, H-1118 Budapest, Hungary

[21] Appl. No.: 810,286

[22] PCT Filed: Apr. 20, 1985

[86] PCT No.: PCT/HU85/00023
§ 371 Date: Dec. 26, 1985
§ 102(e) Date: Dec. 26, 1985

[87] PCT Pub. No.: WO85/04452
PCT Pub. Date: Oct. 10, 1985

[51] Int. Cl.⁴ ............................................. F03B 13/12
[52] U.S. Cl. ........................................ 290/54; 290/53
[58] Field of Search ......................................... 290/53

[56] References Cited
U.S. PATENT DOCUMENTS
4,208,878  6/1980  Rainey ................................. 290/53

Primary Examiner—Bernard Roskoski
Attorney, Agent, or Firm—Handal & Morofsky

[57] ABSTRACT

In a stationary weir erected in a surface water at least one inner shaft (1) is provided which by closure members (2, 3) communicates with the upstream and downstream water levels. In the shaft (1) a sufficiently heavy float (4) is mounted for movement which by its up and down movement actuates an operating chamber (8) of a dual functioning piston pump operating in turn on a liquid chamber of a hydropneumatic pressure storage tank (13). Pressurized fluid (10) which is brought to a high pressure in this manner is supplied to a flow machine, preferably a turbine (20) and expanded and returned to chamber (8) in a closed cycle.

4 Claims, 1 Drawing Sheet

HYDROPNEUMATIC WATER ENGINE

FIELD AND BACKGROUND OF THE INVENTION

The present invention relate to a hydropneumatic water engine, in which a dual-acting piston pump operated by a constantly and slowly moving large body of water and which has an operating cylinder coupled to a pressure storage container from which the pressurized fluid is fed into an expansion chamber of a well-known flow machine, such as a turbine.

Since thousands of years water powered machines have been known, which used the energy of a flowing or of a falling surface water for the driving of different work machines, such as mills, water lifting machines, etc. There have also been apparatus and equipment known, in which the movement of the motion, that is the periodic change of the water level caused by the high and the low tides have been made use of.

The known types of contemporary hydroelectric machines embody the different types of water driven turbines. For driving the turbines one requires a higher pressure, i.e., a correspondingly high water flow velocity. There are hydroelectric stations known, in which the height of the waterfall, that is, the level difference between the high water and the low water marks is more than 200 meters. In order to attain the necessary height for the waterfall, that is, in order to have sufficient storage water available, dams are constructed at high cost.

SUMMARY AND OBJECTS OF THE INVENTION

The object of the present invention is to provide a water powered engine, which makes use of the energy of slowly moving large bodies of water and which is able to turn it into a work producing form.

The above object will be solved by a hydropneumatic water powered machine of the above-noted type, in which a weir is ankered in a reinforced bottom under a body of water and which, according to the invention, comprises at least one input opening of sufficiently large cross section and formed above the bottom and which can be closed by closing means and including a substantially vertical inner shaft which is communicated by the closing means with the high as well as with the low water levels. In each shaft, if there are more than one, there is a sufficiently heavily weighted floating body mounted for movement in the vertical direction within the shaft. The floating body is coupled by means of a longitudinal adjustable rod with a liquid pump of a dual-acting piston type communicating on its pressure side with the liquid chamber of a hydropneumatic pressure storage tank. The pressure storage tank contains above the pressurized liquid level compressed air which is being constantly pressurized by the liquid. The liquid space of the pressure storage tank is connected by a pressure conduit with the expansion chamber of a known flow machine, preferably of a turbine or a hydromotor, for a work producing expansion of the hydraulic pressurized liquid.

For the operational control of the water powered machine level sensors are provided for sensing the high and low water level and which according to the changes of the water level on both sides of the weir, control the closure members.

According to the present invention, the hydraulic pressurized fluid is contained in a closed cycle.

The operating cylinder which is in the form of a dual-acting piston pump, on its suction side is coupled by means of a suction conduit with the expansion chamber of a collector reservoir serving for the collection of the expanded pressurized fluid.

As a hydraulic pressurized liquid, one may consider the known hydraulic oils, or water which should be given an additive of an appropriate nature to improve its viscosity and to prevent its sudsing.

BRIEF DESCRIPTION OF THE DRAWING

The invention will become more readily apparent from the following description of a preferred embodiment thereof with reference to the accompanying drawing, in which.

DESCRIPTION OF THE PREFERRED EMBODIMENT

Figures 1, 2:
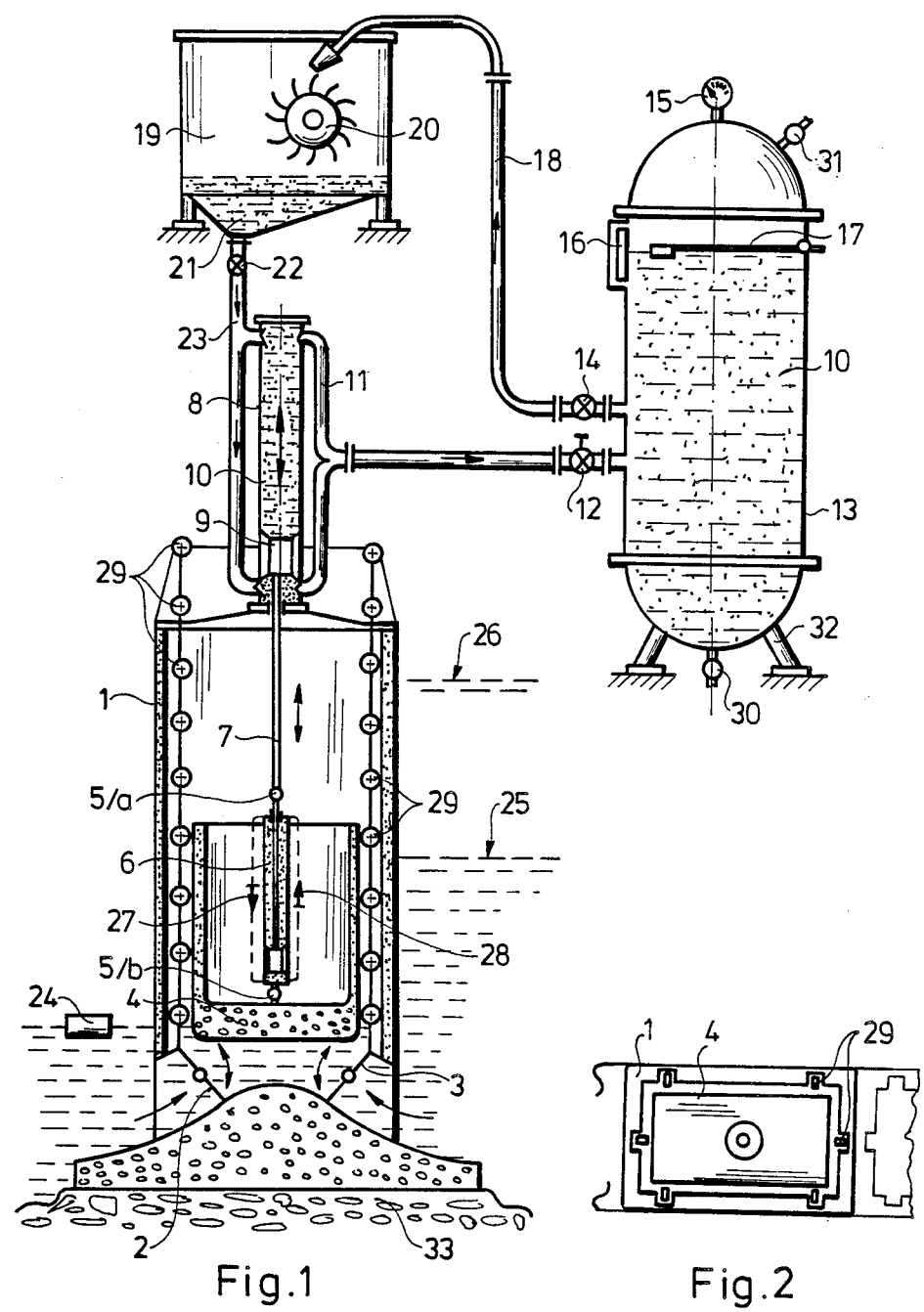
FIG. 1 is a simplified schematic illustration of the operational connections of an exemplary embodiment of the water powered machine according to the present invention.
FIG. 2 is a partial top view of a weir in which next to each other several shafts and floats are present according to the present invention.

With reference to FIG. 1 it is seen that the water powered machine according to the present invention in a sufficiently reinforced bottom 33 of a river a weir is ankered and in which at least one substantially vertical inner shaft 1 is constructed. The weir itself may be prefabricated and assembled in the area of construction and formed into a serially connected shaft assembly which will span the entire width of the river. In the shaft 1 a sufficiently heavy float 4 is guided by means of rollers 29 in the vertical direction and freely movable therein. In the vicinity of the bottom of the river an inner chamber of the shaft 1 can be communicated by means of closure elements 2, 3 which are controllably closing and opening the flow passages upstream as well as downstream and communicating with the surrounding water. The float 4 is coupled by means of a longitudinally movable piston rod 7 of a piston 9. The rod 7 is adjustable by a cylinder 6 and gear pump 27, 28. The piston 9 is of a dual acting piston pump which on its pressure side is connected to a liquid chamber of hydropneumatic pressure storage container 13 and which contains an operating cylinder 8 for the hydraulic pressurized liquid. The rod 7 is connected with the piston 9 for force and motion transmission, in both direction. The rod between the float 4 and the piston 9 includes two ball joints 5/a and 5/b for a smooth motion transmission. The liquid chamber of the pressure container set on supporting legs 32 and is coupled with both chambers of the operating cylinder 9 through an input valve 12 and, it is communicating through an output valve 14 and a pressure conduit 18 with an expansion chamber 19 of a flow machine, which here is illustrated as the wheel of a turbine 20. The pressure container 13 is a pressurized vessel, known per se, which above its liquid level has a pressurized air present in it and the pressure of its depends from the instantaneous liquid level and, at the lower portion, has an output valve 30 for the removal and filling of the fluid if necessary as well as for cleaning. The container 13 on its upper part has a pressure indicator 15, a level indicator 16 as well as a built-in level sensor 17 for remote control purposes.

In order to create a closed cycle for the hydraulic pressurized fluid 10, in the expansion chamber 19 of the turbine 20 a collecting reservoir 21 is provided, in which the expanded pressurized liquid 10 is collected. The reservoir 21 is connected by a valve 22 and a suction conduit 23 with the suction side (by means of a built-in flap valve of known construction) of the operating cylinder 8 of the dual-acting piston pump 9.

For an automatic controlling of the machine (which is not illustrated in detail) on both sides of the weir, that is, on the high water and also on the low water side, level sensors 24 and 25 are provided. The high water level is indicated at 26.

The water powered machine which is illustrated in FIG. 1 in its rest position and as described above, will operate in the following manner:

By opening the closure member 3, the water will flow from the high water side in to the shaft 1 and the float 4 will rise. Under the force of the rod the piston 9 of the operating cylinder 8 will move upward and the pressurized liquid 10 will enter through conduit 11 from the upper cylinder chamber into the pressurized storage tank 13. The pressurized air in the storage tank becomes further compressed, and an increased pressure will be created.

A constant desired value of the pressure in the storage tank 13 is regulated and limited by the pressure regulating valve as far as its upper limit is concerned. If now the outlet valve 14 is opened, then the pressurized liquid 10 will flow through the pressure conduit 18 into the expansion chamber 19 of the turbine 20 and applied in a work producing fashion to the wheel of the turbine. It becomes expanded by setting the wheel into rotation. From the collector reservoir 21, by opening the valve 22, the expanded pressurized liquid will be sucked back through the suction conduit 23 into the operating cylinder 8 (either into the upper or lower cylinder chamber depending on the direction of the stroke).

After the float 4 has reached its upper limiting position, through a signal, the device which automatically controls the entire machine, will close the closure member 3 and the closure member 2 will open. The water will flow from the shaft 1 out and the float will under the effect of the gravity sink downward, whereupon the operating cylinder 8 which will function as a pump in the opposite direction, but will still operate on the pressurized storage tank 13. When the lower end position of the float 4 has been reached, then the closure member 2 will be closed and the closure member 3 will open, and the above-described process will cyclically repeat itself. As a result a stationary steady state operation is accomplished.

The changes in the water level due to supply variation, such as high water or during periods of drought, are constantly sensed by the two level sensors 24, 25. Their signals serve to regulate the length of the force and motion transmitting rod by the operation of the adjusting cylinder 6 by means of the gear pump 27, 28. Such operation affects the rod setting with respect to the water levels on the high water and on the low water sides. The gear pumps 27, 28 may be high pressure pumps having a small delivery capacity. For the guiding of the float 4 rollers 29 are provided which are in the form of rollers journalled in a free running fashion or rollers which are provided with an elastic, preferably rubber cover. From time to time it may be necessary to put pressurized air into the pressure storage tank 13 by means of a fill-up valve 31 in order to compensate for possible pressure losses.

In order to provide a possibly pulsation-free operation, it turned out to be an advantage to provide for a single hydropneumatic pressure storage tank 13 simultaneously more floats 4 which would be associated with several operating cylinders 8 functioning as dual-acting piston pumps and which are arranged in a phase-shifted fashion. The water powered machine of the invention if made up from such components can serve for the structuring of an entire power station.

Within the scope of the following claims defining the scope of the invention are obviously other embodiments and variations are possible which may somewhat differ from the above-described embodiments but should fall within the scope of the present invention.

I claim:

1. A hydropneumatic water powered machine, comprising a weir anchored in a reinforced bottom under a body of water having level changes between a high and a low water level, a substantially vertical inner shaft including passages for communicating with the surrounding water upstream and downstream, closure members arranged above the bottom of the floor under the body of the water and operating in a controllable fashion for opening or closing the associated communicating passages, a sufficiently weighted float located in said shaft and being guided for freely moving in the vertical direction, a longitudinally adjustable rod, a liquid pump, said adjustable rod coupling said float to said liquid pump, a hydropneumatic pressure storage container including a liquid chamber for a hydraulic pressurized fluid, said pump is a dual-acting piston pump for said hydraulic pressurized fluid and having an operating cylinder, means for coupling said piston pump in both stroke direction with said rod in a force and motion transmitting fashion and conduit means for communicating the operating cylinder of said dual-acting piston pump with the liquid chamber of the pressure storage container, pressure conduit means for coupling said container for work producing expansion of the hydraulic pressurized fluid therein with an expansion chamber of a flow machine, such as a turbine.

2. The hydropneumatic water powered machine according to claim 1, comprising level sensors for sensing the upper and lower water level and including devices for controlling the opening and closing of the closure members in a directional dependence from the change of the water levels present on both sides of the weir.

3. The hydropneumatic water powered machine according to claim 2, wherein a closed cycle is provided, for the hydraulic pressurized fluid and wherein a suction conduit is provided for coupling the suction side of said piston pump with the expansion chamber of the flow machine for collecting the expanded pressurized liquid.

4. The hydropneumatic water powered machine according to claim 1, wherein means are provided for coupling said turbine into driving relationship with a generator for producing electrical energy.

* * * * *